(12) United States Patent
Millington et al.

(10) Patent No.: US 12,343,705 B2
(45) Date of Patent: Jul. 1, 2025

(54) TWC CATALYSTS FOR GASOLINE ENGINE EXHAUST GAS TREATMENTS

(71) Applicant: Johnson Matthey Public Limited Company, London (GB)

(72) Inventors: Paul Millington, Reading (GB); Nicoleta Muresan, Reading (GB); Andrea Eva Pascui, Reading (GB); Maria C. Vlachou, Reading (GB)

(73) Assignee: Johnson Matthey Public Limited Company, London (GB)

( * ) Notice: Subject to any disclaimer, the term of this patent is extended or adjusted under 35 U.S.C. 154(b) by 447 days.

(21) Appl. No.: 17/820,270

(22) Filed: Aug. 17, 2022

(65) Prior Publication Data
US 2023/0070493 A1 Mar. 9, 2023

Related U.S. Application Data

(60) Provisional application No. 63/260,465, filed on Aug. 20, 2021.

(51) Int. Cl.
| | | |
|---|---|---|
| *B01J 23/44* | (2006.01) | |
| *B01D 53/94* | (2006.01) | |
| *B01J 23/42* | (2006.01) | |
| *B01J 37/02* | (2006.01) | |

(Continued)

(52) U.S. Cl.
CPC ............ *B01J 23/44* (2013.01); *B01D 53/945* (2013.01); *B01D 53/9468* (2013.01);
(Continued)

(58) Field of Classification Search
CPC ........ B01J 23/44; B01J 23/42; B01J 37/0215; B01J 23/56; B01J 37/0018; B01D 53/945; B01D 53/9468; B01D 53/9472; B01D 2255/1021; B01D 2255/1023; B01D 2255/1025; B01D 2255/9022; B01D 2255/9032; B01D 2255/2092; B01D 2255/9202; B01D 2258/014; F01N 3/101; F01N 3/2803; F01N 2370/04; Y02T 10/12

See application file for complete search history.

(56) References Cited

U.S. PATENT DOCUMENTS

| | | | | |
|---|---|---|---|---|
| 2009/0193796 A1* | 8/2009 | Wei | ........................ | F01N 3/0814 60/299 |
| 2011/0245073 A1* | 10/2011 | Oljaca | ...................... | B01J 23/44 502/328 |

(Continued)

FOREIGN PATENT DOCUMENTS

| | | |
|---|---|---|
| EP | 3 991 839 A1 | 5/2022 |

OTHER PUBLICATIONS

Zhang, et al., "Carbon-Supported Pd—Pt Nanoalloy with Low Pt Content and Superior Catalysis for Formic Acid Electro-oxidation", J. Phys. Chem., C 2010, 114, pp. 6446-6451, 2010.

(Continued)

*Primary Examiner* — Brandon D Lee

(57) ABSTRACT

A catalyst composition comprising a first platinum group metal (PGM) component and a first support material, wherein the first PGM component comprises platinum (Pt) and palladium (Pd) and is supported on the first support material; and wherein the first PGM component has a Pt:Pd molar ratio of from about 5:95 to about 95:5.

21 Claims, 6 Drawing Sheets

(51) Int. Cl.
*F01N 3/10* (2006.01)
*F01N 3/28* (2006.01)

(52) U.S. Cl.
CPC .......... *B01D 53/9472* (2013.01); *B01J 23/42* (2013.01); *B01J 37/0215* (2013.01); *F01N 3/101* (2013.01); *F01N 3/2803* (2013.01); *B01D 2255/1021* (2013.01); *B01D 2255/1023* (2013.01); *B01D 2255/1025* (2013.01); *B01D 2255/9022* (2013.01); *B01D 2255/9032* (2013.01); *F01N 2370/04* (2013.01)

(56) References Cited

U.S. PATENT DOCUMENTS

| 2020/0024295 | A1* | 1/2020 | Muresan | B01J 35/23 |
| 2023/0381748 | A1* | 11/2023 | Hirao | B01J 35/19 |

OTHER PUBLICATIONS

Gorzkowski, et al., "Probing the Limits of d-Band Center Theory: Electronic and Electrocatalytic Properties of Pd-Shell-Pt-Core Nanoparticles", J. Phys. Chem., C 2015, 119, 32, pp. 18389-18395, 2015.

Wu, et al., "Understanding Composition-Dependent Synergy of PtPd Alloy Nanoparticles in Electrocatalytic Oxygen Reduction Reaction", J. Phys. Chem., C 2017, 121, 26, pp. 14128-14136, 2017.

Peterson, et al., "Low-temperature carbon monoxide oxidation catalysed by regenerable atomically dispersed palladium on alumina", Nature Communications, vol. 5, Article No. 4885, 2014.

* cited by examiner

TWC CATALYSTS FOR GASOLINE ENGINE EXHAUST GAS TREATMENTS

FIELD OF THE INVENTION

The present invention relates to a catalysed article useful in treating exhaust gas emissions from gasoline engines and specifically to a catalyst composition, a catalyst article, an emission treatment system, a method of treating an exhaust gas and a method of manufacturing a catalyst article.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

Palladium (Pd) and rhodium (Rh) have been widely used in TWC formulations to reduce harmful emissions in gasoline vehicles. In fact, at present TWC technology is highly dependent on Pd/Rh systems. However, in recent years, these precious metal prices have climbed up to be even more precious, due to rising demand in the market. On the other hand, tighter and tighter environmental regulations worldwide have forced automobile industries to put even more precious metals into their catalytic converters. As a result, there is a potential market risk due to the recent Pd demand outweighing the Pd supply.

In the meantime, platinum (Pt) has become a more attractive candidate for gasoline applications due to its relatively cheaper price. In the last 12 months (from July 2021, according to http://www.platinum.matthey.com), the average prices of Pt and Pd were about $1085 and $2660 dollars/Oz respectively. Thus, there are huge financial incentives on how to introduce Pt into catalyst formulations, to at least partially replace Pd while hoping to maintain comparable catalyst performances.

Thus, there is a desire to provide a cheaper catalyst for TWC applications that may still have comparable or improved activity compared to the conventional TWC catalysts currently in use.

SUMMARY OF THE INVENTION

One aspect of the present disclosure is directed to a catalyst composition comprising a first platinum group metal (PGM) component and a first support material, wherein the first PGM component comprises platinum (Pt) and palladium (Pd) and is supported on the first support material; and wherein the first PGM component has a Pt:Pd molar ratio of from about 5:95 to about 95:5.

Another aspect of the present disclosure is directed to a catalyst article for treating exhaust gas comprising: a substrate; and a first catalytic region comprising a first platinum group metal (PGM) component and a first support material, wherein the first PGM component comprises platinum (Pt) and palladium (Pd) and is supported on the first support material; and wherein the first PGM component has a Pt:Pd molar ratio of from about 5:95 to about 95:5.

The invention also encompasses an emission treatment system comprising the catalyst composition or catalyst article described herein.

Another aspect of the present disclosure is directed to a method of treating an exhaust gas, the method comprising: providing the catalyst composition or the catalyst article described herein; and contacting the catalyst composition or catalyst article with an exhaust gas.

Another aspect of the present disclosure is directed to a method of manufacturing a catalyst article, the method comprising: providing a slurry comprising: platinum (Pt) and palladium (Pd) ions in a molar ratio of from about 5:95 to about 95:5, and a support material; disposing the slurry on a substrate; and heating the slurry to form nanoparticles of the Pt and Pd on the support material.

The invention also encompasses a catalyst article as described herein, wherein the catalyst article is obtained or obtainable by the method of manufacturing a catalyst article described herein.

BRIEF DESCRIPTION OF THE DRAWINGS

FIG. 1B depicts a variation of FIG. 1a.

FIG. 2b depicts a variation of FIG. 2a.

DETAILED DESCRIPTION OF THE INVENTION

Figure 1A:
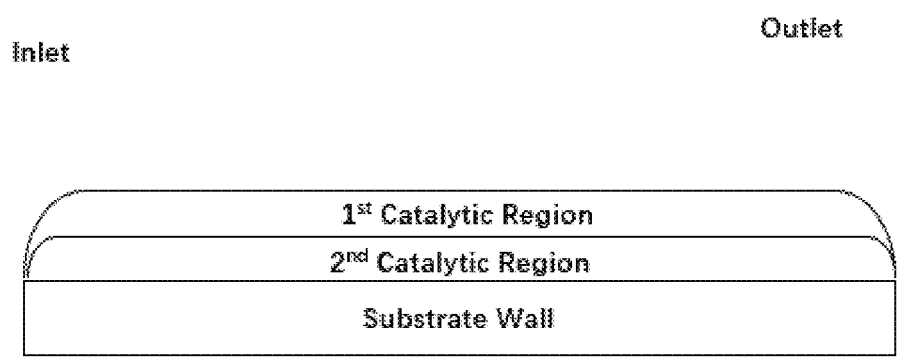
FIG. 1a shows one embodiment according to the present invention, the first catalytic region extends 100% of the axial length L, as top layer; the second catalytic region extends 100% of the axial length L, as bottom layer.

The present invention seeks to tackle at least some of the problems associated with the prior art or at least to provide a commercially acceptable alternative solution thereto.

In a first aspect, the present invention provides a catalyst composition comprising a first platinum group metal (PGM) component and a first support material, wherein the first PGM component comprises platinum (Pt) and palladium (Pd) and is supported on the first support material; and wherein the first PGM component has a Pt:Pd molar ratio of from about 5:95 to about 95:5.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when used in an emission treatment system, the catalyst composition of the present invention provides comparable or improved catalytic (i.e. TWC) activity compared to conventional catalyst compositions comprising Pd with no Pt replacement. For a wide range of TWC operating conditions, Pt is known to have lower catalytic (i.e. TWC) activity compared to Pd. Thus, it is surprising that replacing any amount of the Pd in the catalyst composition with Pt would not have a negative effect on the catalytic activity thereof. However, the inventors have surprisingly found that replacing from about 5 mol. % to about 95 mol. % of the Pd in such a catalyst composition with Pt (i.e. in order to provide a desirably cheaper catalyst composition) provides a catalyst composition with comparable or even improved catalytic (i.e. TWC) activity. As described in more detail herein, at certain specific ratios of Pt to Pd (i.e. replacing a certain amount of Pd with Pt within the above range), a catalyst composition can be obtained that may actually have improved catalytic (i.e. TWC) activity compared to catalyst compositions comprising Pd with no Pt replacement. Such catalyst compositions may also demonstrate lower light-off temperatures compared to catalyst compositions comprising Pd with no Pt replacement.

Moreover, it has also surprisingly been found that such a catalyst composition may be more robust to changes in exhaust gas conditions, for example from lean to rich conditions and in different ageing conditions. Along with increased catalytic (i.e. TWC) activity, this may be a particularly advantageous property for use in exhaust systems commonly used at present.

In particular, when used in an exhaust system the catalyst composition of the present invention may surprisingly result in a significantly improved reduction in CO emissions, improved NOx conversion and comparable or improved reduction in hydrocarbon (HC) emissions in combination. Thus, not only may the catalyst composition described herein be desirably cheaper than conventionally used catalyst compositions comprising Pd with no Pt replacement, but such catalyst compositions may also exhibit desirably improved catalytic performance. Without wishing to be bound by theory, it is hypothesised that the increased performance against CO emissions may be as a result of the Pd being less poisoned by CO or having better CO oxidation activity due to the presence of the Pt and interaction thereof with the Pd.

Without wishing to be bound by theory, it is also hypothesised that a Pt—Pd alloy may form in the catalyst composition, in which the alloy substantially maintains the Pd character (for example due to comprising a majority of Pd). It is thought that this may contribute to the increased or comparable performance that may be provided by the catalyst composition described herein. In other words, the maintenance of the Pd character of such an alloy may mean that the replacement of Pd with the less-active Pt would not reduce the catalytic (i.e. TWC) activity of the catalyst composition. For example, the presence of Pt may induce an electronic modification of the Pd such that the adsorption/dissociation energies of the pollutants on the metal are altered, while still maintaining substantially Pd character. This may then lead to the above-described advantageous properties, without wishing to be bound by theory.

The term "catalyst composition" as used herein may encompass a composition that exhibits catalytic activity, particularly for use in the treatment of exhaust gas, preferably from a gasoline engine. In other words, the catalytic composition may demonstrate catalytic activity towards one or more of the oxidation of CO, the oxidation of unburnt HCs and the reduction of NOx. Preferably, the catalyst composition is for three-way catalysis. In other words, the catalyst composition may be a three-way catalyst.

Unless otherwise specified, the terms "first", "second", "third" etc. as used herein are for the purposes of clarity only and are used as labels to help distinguish certain features from one another. This wording is not intended to limit any particular order of features or components, for example, or indicate whether a certain feature is preferred over another.

The term "platinum group metal (PGM)" as used herein may encompass a metal selected from the group consisting of Ru, Rh, Pd, Os, Jr and Pt, preferably a metal selected from the group consisting of Ru, Rh, Pd, Jr and Pt. In general, the term "PGM" preferably refers to a metal selected from the group consisting of Rh, Pt and Pd.

The first PGM component comprises Pt and Pd. Preferably, the first PGM component consists essentially of, or even consists of Pt and Pd. The first catalyst component may comprise PGMs other than Pt and Pd in addition to Pt and Pd.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The term "support material" as used herein may encompass any material that is capable of supporting the first PGM component thereon or therein. The support material may take any form, but is typically in the form of a powder, more typically a high surface area powder. When the catalyst composition of the present invention is used to prepare a catalysed filter, such as a wall flow filter or flow-through filter, for example, the support material will typically be in the form of a powder having a $D_{50}$ of, for example, from 0.1 to 30 μm, more typically from 0.5 to 25 μm as measured using TEM, even more typically 1 to 20 μm. Such particle sizes may facilitate desirable rheological properties of a slurry used to coat the filter. The support material may function as a washcoat. The support material may be a washcoat or may be part of a washcoat.

The support material may also serve as an oxygen storage material, which stores and releases oxygen respectively at fuel lean and fuel rich conditions, for facilitating the three-way catalytic conversion.

The first PGM component is supported on the first support material. The term "supported on" as used in this context may encompass a situation where the first PGM component is loaded on the external surface of the support material (e.g. on the surface of a high-surface area metal oxide support material) or contained within the support material, such as within the pores thereof (e.g. within the pores of a zeolite support material).

The first PGM component has a Pt:Pd molar ratio of from about 5:95 to about 95:5. In other words, the first PGM component has from about 5 to about 50 mol. % Pt, based on the total moles of Pt and Pd. When the first PGM component consists of Pt and Pd, the first PGM component therefore comprises about 5 to about 50 mol. % Pt, based on the total moles of the first PGM component.

The Pt:Pd molar ratio is preferably from about 5:95 to about 90:10, more preferably from about 5:95 to about 75:25, even more preferably from about 10:90 to about 50:50, still even more preferably from about 10:90 to about 35:65, and most preferably from about 10:90 to about 25:75; for example preferably any of from about 7:93 to about 15:85, from about 7:93 to about 14:86, from about 7:93 to about 13:87, from about 7:93 to about 12:88, from about 7:93 to about 11:89, from about 8:92 to about 15:85, from about 8:92 to about 14:86, from about 8:92 to about 13:87, from about 8:92 to about 12:88, from about 8:92 to about 11:89, from about 9:91 to about 14:86, or from about 9:91 to about 13:87. In some preferred embodiments, the Pt:Pd molar ratio may be from about 9:91 to about 11:89.

The inventors have surprisingly found that replacing approaching about 10 mol. % Pd with Pt in a Pd-containing catalyst, such as a TWC catalyst, may provide improved catalytic performance as described herein, while also providing for a cheaper catalyst composition due to the current difference in price between Pt and Pd. As demonstrated in the Examples below, the best advantages have been shown when the Pt:Pd molar ratio is approaching about 10:90. However, throughout the claimed range (for example, approaching a Pt:Pd molar ratio of 95:5) a cheaper catalyst may still be provided which may unexpectedly provide at least comparable, but preferably improved catalytic (i.e. TWC) performance.

The Pt and Pd are preferably at least partially alloyed, more preferably substantially alloyed, even more preferably completely alloyed. The term "alloy" or "alloyed" as used herein takes on its usual meaning in the art. TEM and XRD characterisation techniques may be used to help determine whether or not a Pt—Pd alloy has formed, using techniques known to the skilled person. Without wishing to be bound by theory, it is hypothesised that the formation of such an alloy may contribute to the achievement of the advantageous properties, such as comparable or improved catalytic activity, lower light-off temperatures and resistance to ageing described and demonstrated herein. Such an alloy of the Pt and Pd may form during the manufacture of the catalyst composition, such as during a calcining and/or heating step that may be performed. Alternatively, such an alloy may form during use (e.g. ageing) of the catalyst composition, due to the high temperatures experienced in exhaust systems, for example. That is, a mixture of Pt and Pd nanoparticles that may be in close proximity on the support material may coalesce and form an alloy at such temperatures, for example.

The expression "substantially alloyed" as used herein refers to at least 75% of the PGM contained within the catalytic region of interest being present as an alloyed phase. The expression "partially alloyed" as used herein refers to at least 25% of the PGM contained within the catalytic region of interest being present as an alloyed phase The likelihood of such potentially beneficial alloying occurring may be increased during manufacture of the catalyst composition by, for example, using a method that helps to ensure a homogeneous distribution of Pt and Pd on the support material, preferably one that also ensures a homogeneous distribution of Pt and Pd nanoparticles having a small particle size on the support material, such as less than 50 nm, less than 30 nm or even less than 20 nm, in terms of the mean particle size determined by TEM. In other words, close proximity of small Pt and Pd nanoparticles on the support material may help to increase the likelihood of alloying of the Pt and Pd in the first PGM component. The first PGM component preferably consists of an alloy of Pt and Pd.

The first support material preferably comprises an inorganic oxide. The inorganic oxide is preferably selected from one or more of cerium oxide, a ceria-zirconia mixed oxide, an alumina-ceria-zirconia mixed oxide, alumina, magnesia, silica, lanthanum, neodymium, praseodymium, yttrium oxides, and mixed oxides or composite oxides thereof, or a zeolite. The inorganic oxide is preferably a metal oxide. The first support material is preferably selected from alumina, preferably gamma-alumina, a ceria-zirconia mixed oxide, or a combination thereof. In other words, the first PGM component is preferably supported on alumina and/or ceria-zirconia. Any number of support materials may be present, provided that the Pt and the Pd of the first PGM component are both supported together thereon or therein, in order to enable an interaction between the Pt and the Pd.

The alumina and/or ceria-zirconia mixed oxide is preferably doped. The alumina and/or ceria-zirconia mixed oxide is preferably doped with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, preferably one or more of lanthanum, neodymium, praseodymium and yttrium, more preferably lanthanum. Such doped oxides are particularly effective as support materials. Preferably, the dopant is present in the alumina and/or ceria-zirconia mixed oxide in an amount of from 0.001 wt. % to 20 wt. %, preferably from 0.5 wt. % to 10 wt. %.

The first support material or inorganic oxide of the first support material is preferably in the form of a powder having a $D_{90}$ of from 0.1 to 25 µm, preferably from 0.5 to 5 µm, measured by TEM.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The catalyst composition preferably further comprises a second PGM component and a second support material. The second PGM component preferably comprises rhodium (Rh), a Rh alloy, Pt, a Pt alloy, a Rh—Pt alloy or a mixture thereof. The second PGM component preferably comprises Rh. Thus, the catalyst composition is preferably a trimetallic (i.e. Pt, Pd and Rh) catalyst composition, which is preferably a TWC. When Rh is present, for example, this may offset any (albeit slight) deterioration in performance for catalyst compositions in which a higher-percentage of Pd has been replaced by Pd, for example over about 25 mol. %. In other words, in catalyst compositions that further comprise Rh, even for higher Pt content in the first PGM component (e.g. approaching 95:5 molar ratio Pt:Pd) a comparable or improved catalytic performance may be achieved even if the higher amounts of Pt may result in minimal change in catalytic performance. Moreover, such a catalyst composition may have an even lower cost first PGM component.

In a further aspect, the present invention provides a catalyst article for treating exhaust gas comprising:
  a substrate; and
  a first catalytic region comprising a first platinum group metal (PGM) component and a first support material, wherein the first PGM component comprises platinum (Pt) and palladium (Pd) and is supported on the first support material; and
  wherein the first PGM component has a Pt:Pd molar ratio of from about 5:95 to about 95:5.

The term "catalyst article" used herein may encompass an article in which a catalyst is supported thereon or therein. The article may preferably take the form of, for example, a honeycomb monolith, or a filter, e.g. preferably a wall flow filter or a flow-through filter. The catalyst article may be for use in an emission treatment system, in particular an emission treatment system for a gasoline engine, preferably a stoichiometric gasoline engine. The catalyst article may be for use in three-way catalysis. In other words, the catalyst article may be a TWC.

The term "substrate" as used herein may encompass, for example, a ceramic or metallic honeycomb, or a filter block, e.g. preferably a wall flow filter or flow-through filter. The substrate may comprise a ceramic monolithic substrate. The substrate may vary in its material composition, size and configuration, cell shape and density, and wall thickness. Suitable substrates are known in the art.

Unless otherwise stated, the preferences, embodiments and definitions described above for the first aspect (the catalyst composition described herein) in relation the first PGM component and the first support material apply equally to the present aspect (the catalyst article).

The term "region" or "catalytic region" as used herein refers to an area on a substrate containing a catalyst, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The catalyst article preferably further comprises a second catalytic region. The second catalytic region preferably comprises a second PGM component and a second support material. The second PGM component preferably comprises rhodium (Rh), a Rh alloy, Pt, a Pt alloy, a Rh—Pt alloy or a mixture thereof. The second PGM component preferably comprises Rh. Thus, the catalyst article is preferably a tri-metallic (i.e. Pt, Pd and Rh) catalyst composition, which is preferably a TWC. As in conventional TWC catalysts, the catalytic region comprising Rh is a different catalytic region to the Pd-based catalytic region (i.e. the first catalytic region described herein). When Rh is present, for example, this may offset any deterioration in performance for catalyst compositions in which a higher-percentage of Pd has been replaced by Pd, for example over about 25 mol. %. In other words, in catalyst compositions that further comprise Rh, even for higher Pt content in the first PGM component (e.g. approaching 95:5 molar ratio Pt:Pd) a comparable or improved catalytic performance may be achieved even if the higher amounts of Pt may result in minimal change in catalytic performance. Moreover, such a catalyst article would may have an even lower cost first PGM component.

The catalyst composition, the first catalytic region and/or the second catalytic may comprise additional components such as, for example, one or more of a promoter, a binder and a thickening agent.

Promoters may include, for example, a non-PGM transition metal element, a rare earth element, an alkali or alkali earth group element, and/or a combination of two or more of the above elements within the same or different groups in periodic table. The promoter may be a salt of such elements. A particularly preferred promoter is barium, with particularly preferred salts thereof being barium acetate, barium citrate and barium sulfate, or a combination thereof, more preferably barium citrate.

Binders may include, for example, an oxide material with small particle size to bind the individual insoluble particles together in washcoat slurry. The use of binders in washcoats is well known in the art.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include glactomanna gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

Preferably, the first catalytic region and the second catalytic region form distinct layers, wherein the second catalytic region is deposited directly on the first catalytic region, i.e. the first catalytic region is sandwiched between the second catalytic region and the substrate (e.g. a filter wall). In another preferred embodiment, the first catalytic region and the second catalytic region form distinct layers, wherein the first catalytic region is deposited directly on the second catalytic region.

The first catalytic region may be supported/deposited directly on the substrate, i.e. the first catalytic region is in direct contact with the substrate. Alternatively, the second catalytic region may be supported/deposited directly on the substrate.

Figure 1B:
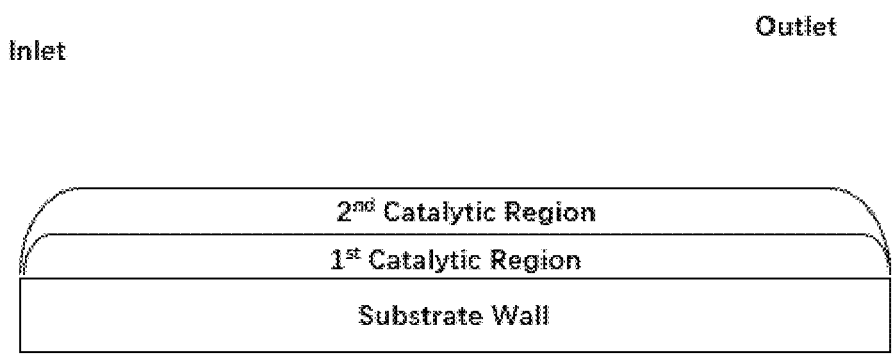
Figure 2A:
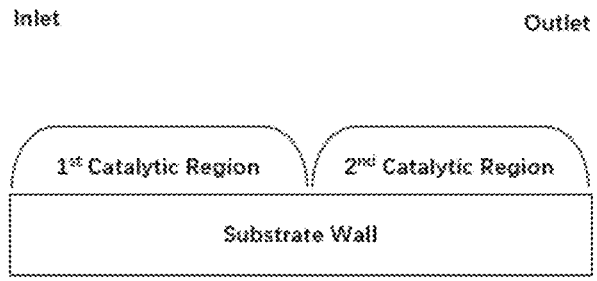
FIG. 2a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 2B:
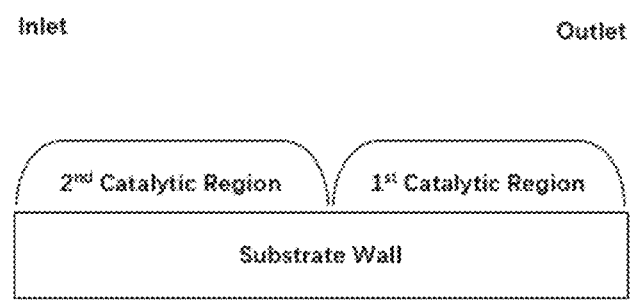
Figure 2C:
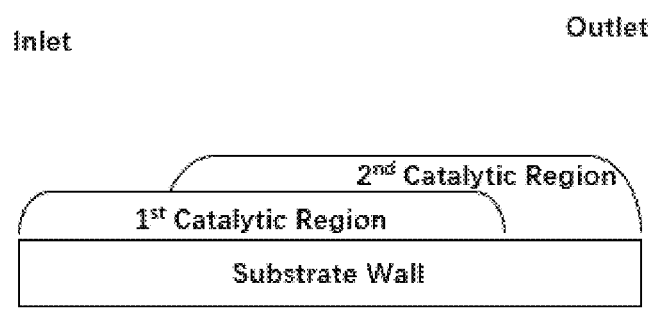
FIG. 2c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 2D:
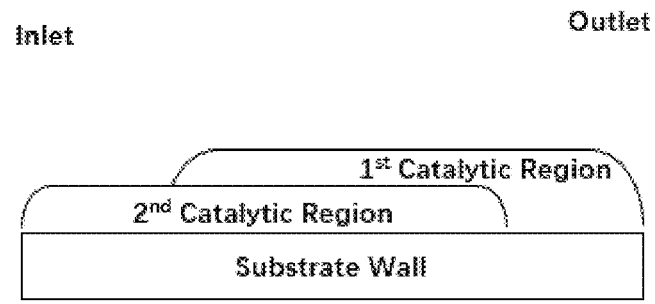
FIG. 2d depicts a variation of FIG. 2c.

Typically, the substrate comprises a first end and a second end with an axial length L. In some preferred embodiments, the first catalytic region extends for the entire axial length L and/or the second catalytic region extends for the entire axial length L (e.g. FIGS. 1a and 1b). In other preferred embodiments, the first catalytic region extends for less than the axial length L and/or the second catalytic region extends for less than the axial length L (e.g. FIGS. 2a-d). When the first catalytic region extends for less than the axial length L, the first catalytic region may extend from the first end or the second end. When the second catalytic region extends for less than the axial length L, the second catalytic region may extend from the first end or the second end. When the first or second catalytic region extends for less than the axial length L, the first or second catalytic region may extend for 10%, 20%, 30%, 40%, 50%, 60%, 70%, 80%, or 90%, for example, of the axial length L, e.g. from 10% to 90%, or from 10% to 50%, or from 10% to 30%, or from 30% to 90%, or from 50% to 90%, or from 70% to 90%, or from 20% to 80%, or from 30% to 70%, or from 40% to 60%. The first and second catalytic regions may fully, at least partially, partially or not overlap. Each configuration provides certain advantages depending on the intended use of the catalyst article.

In some preferred embodiments, the first end is an inlet end and the second end is an outlet end of the catalyst article. The terms "outlet end" and "inlet end" as used herein are used in relation to the relative intended direction of exhaust flow for when the catalyst article is placed in exhaust system, for example, the intended direction of exhaust gas being from the inlet end towards the outlet end.

The first catalytic region preferably comprises from 20 $g/ft^3$ to 400 $g/ft^3$ total Pt and Pd, preferably from 30 $g/ft^3$ to 250 $g/ft^3$ or from 40 $g/ft^3$ to 200 $g/ft^3$ total Pt and Pd. The second catalytic region preferably comprises from 2 $g/ft^3$ to 200 $g/ft^3$Rh, preferably from 5 $g/ft^3$ to 100 $g/ft^3$ Rh.

In some preferred embodiments, the first catalytic region of the catalyst article of the present aspect is the catalyst composition according to the first aspect. In other words, in some preferred embodiments, the first catalytic region of the catalyst article of the present aspect is formed of the catalyst composition according to the first aspect In a further aspect, the present invention provides an emission treatment system comprising the catalyst composition or catalyst article described herein.

The emission treatment system is preferably for a gasoline engine.

The gasoline engine preferably operates under stoichiometric conditions.

In a further aspect, the present invention provides a method of treating an exhaust gas, the method comprising: providing the catalyst composition or catalyst article described herein; and contacting the catalyst composition or catalyst article with an exhaust gas.

The exhaust gas is preferably from a gasoline engine. The catalyst article is particularly suitable for treating such exhaust gas. Moreover, exhaust from a gasoline engine is typically harsher, for example higher temperature, than that from a diesel engine. Therefore, the advantageous ageing properties of the catalyst articles described herein are particularly beneficial therefor. The gasoline engine preferably operates under stoichiometric conditions.

In a further aspect, the present invention provides a method of manufacturing a catalyst article, the method comprising:
providing a slurry comprising:
platinum (Pt) and palladium (Pd) ions in a molar ratio of from about 5:95 to about 95:5, and
a support material;
disposing the slurry on a substrate; and
heating the slurry to form nanoparticles of the Pt and Pd on the support material.

The term "slurry" as used herein may encompass a liquid comprising insoluble material, e.g. insoluble particles. The slurry may comprise (1) solvent; (2) soluble content, e.g. free Pt and Pd ions (i.e. outside of the support); and (3) insoluble content, e.g. supported particles. A slurry is particularly effective at disposing a material onto a substrate, in particular for maximized gas diffusion and minimized pressure drop during catalytic conversion. The slurry is typically stirred, more typically for at least 10 minutes, more typically for at least 30 minutes, even more typically for at least an hour. The slurry therefore typically comprises a loaded support material (i.e. the support material is preferably a loaded support material). The term "loaded support material" as used herein may encompass a support material that has the Pt and Pd ions loaded thereon (e.g. on the surface of a high-surface area metal oxide support material) and/or loaded therein (e.g. within the pores of a zeolite support material). The Pt and Pd ions are typically fixed to the support, for example by electrostatic forces, hydrogen bonds, coordinate bonds, covalent bonds, and/or ionic bonds. The support material is preferably the first support material described herein.

Providing a slurry typically comprises mixing a solvent, the support material and the Pt and Pd ions (e.g. from a Pt and/or Pd salt, such as Pt or Pd nitrate).

Disposing the slurry on the substrate may be carried out using techniques known in the art. Typically, the slurry may be poured into the inlet of the substrate using a specific moulding tool in a predetermined amount, thereby disposing the loaded support material on the substrate. Subsequent vacuum and drying steps may be employed during the disposition step. When the support is a filter block, the loaded support material may be disposed on the filter walls, within the filter walls (if porous) or both.

Heating the slurry is typically carried out in an oven or furnace, more typically a belt or static oven or furnace, typically in hot air at a specific flow from one direction. The heating may comprise calcination. The heating may also comprise drying. The drying and calcination steps may be continuous or sequential. For example, a separate washcoat may be applied after the substrate is already washcoated and dried with a previous washcoat. A washcoated substrate can also be dried and calcined using one continuous heating program if coating is completed. During the heating, any complex that may have formed in the slurry may at least partially, substantially or completely decompose. In other words, the ligands of such a complex, e.g. an organic compound, are at least partially, substantially or completely removed or separated from the Pt and Pd, and are removed from the final catalyst article. Particles of such separated Pt and Pd may then begin to form metal-metal and metal-oxide bonds. As a result of the heating (calcination), the substrate is typically substantially free of organic compounds, more typically completely free of organic compounds.

The term "nanoparticle" as used herein may encompass a particle having a diameter of from 0.01 nm to 100 nm as measured by TEM. The nanoparticles may be in any shape, e.g. a sphere, a plate, cubic, cylindrical, hexagonal or a rod, but are typically spherical.

Following the heating step, the substrate is typically cooled, more typically to room temperature. The cooling is typically carried out in air with or without cooling agent/media, typically without cooling agent.

The slurry preferably comprises one or more of glyoxime; a glyoxime derivative; salicylaldimine, and a salicylaldimine derivative. Without wishing to be bound by theory, it is thought that complexes comprising such molecules and the Pt and/or Pd may form. Such compounds have surprisingly been found to help enable even distribution of the Pt and Pd, to help achieve the advantageous properties described and demonstrated herein, for example.

The catalyst article described herein is preferably obtained or obtainable by the method of the present aspect. However, alternative methods known to the skilled person may also be used to manufacture the catalyst article described herein, although the method of the present aspect may be particularly suitable.

The invention will now be described in relation to the following non-limiting examples.

Example 1: Light Off Performances in Synthetic Catalyst Activity Test

A series of Pd—Pt supported ceria-zirconia catalysts with a total 1 wt % PGM loading were made by the incipient wetness technique using $Pd(NO_3)_3$ and $Pt(NO_3)_3$ precursors. After drying, they were calcined at 650° C. for 2 hours. The mol % ratios of Pd and Pt are 100:0 (Pd-only reference), 95:5, 90:10, 79:21, 65:35, 47:53 and 0:100 (Pt-only reference), shown in Table 1 below.

TABLE 1

PGM loadings of Catalysts in Example 1

|  | Molar Ratio of Pd:Pt |
|---|---|
| Comparative Catalyst 1 | 100:0 |
| Catalyst 2 | 95:5 |
| Catalyst 3 | 90:10 |
| Catalyst 4 | 79:21 |
| Catalyst 5 | 65:35 |
| Catalyst 6 | 47:53 |
| Comparative Catalyst 7 | 0:100 |

Catalysts were aged according to the TWC ageing conditions in Table 2 and were tested under a continuous gas mix with a typical TWC gas composition. Catalysts in Table 1 were tested from 110 to 500° C. using a ramp rate of 10° C./min. The total flow used was 5 L/min for 0.2 g of catalyst mixed with 0.2 g of cordierite, which was placed in a fix bed reactor. The gases used, and their concentrations are presented in Table 3.

TABLE 2

Ageing conditions for Catalysts in Example 1

| | Perturbed SCAT Ageing | |
|---|---|---|
| | Base mix | +pert. line |
| Lambda | 0.92 | 1.06 |
| Time | 300 sec | 300 sec |
| NO | 1000 ppm | |
| $H_2O$ | 10% | |
| CO | 0.52% | 0.52% |
| $C_3H_8$ | 1000 ppm | |
| $O_2$ | 0.27% | 1.06% |
| $N_2$ | 90% | 88% |
| Ramp rate | 5° C./min | |
| Temp/time | 950° C./16 hours | |
| Flow | 120 L/hour | |

TABLE 3

Gas mix composition for the light-off experiments in Example 1

| | Perturbed SCAT test | |
|---|---|---|
| | Base mix | +pert. line |
| Lambda | 0.99 | 0.05 |
| Time | 3 sec | 3 sec |
| NO | 2200 ppm | |
| $CO_2$ | 14% | |
| $H_2O$ | 4% | |
| CO | 0.73% | 1.47% |
| $C_3H_6$ | 660 ppm | |
| $C_2H_6$ | 330 ppm | |
| $H_2$ | 0.23% | 0.46% |
| $O_2$ | Dependable on λ | 1% |
| Ramp rate | 10° C./min | |
| Max. Temp. | 500° C. | |
| WHSV | 750 $Lg^{-1}h^{-1}$ | |

Figure 3A:
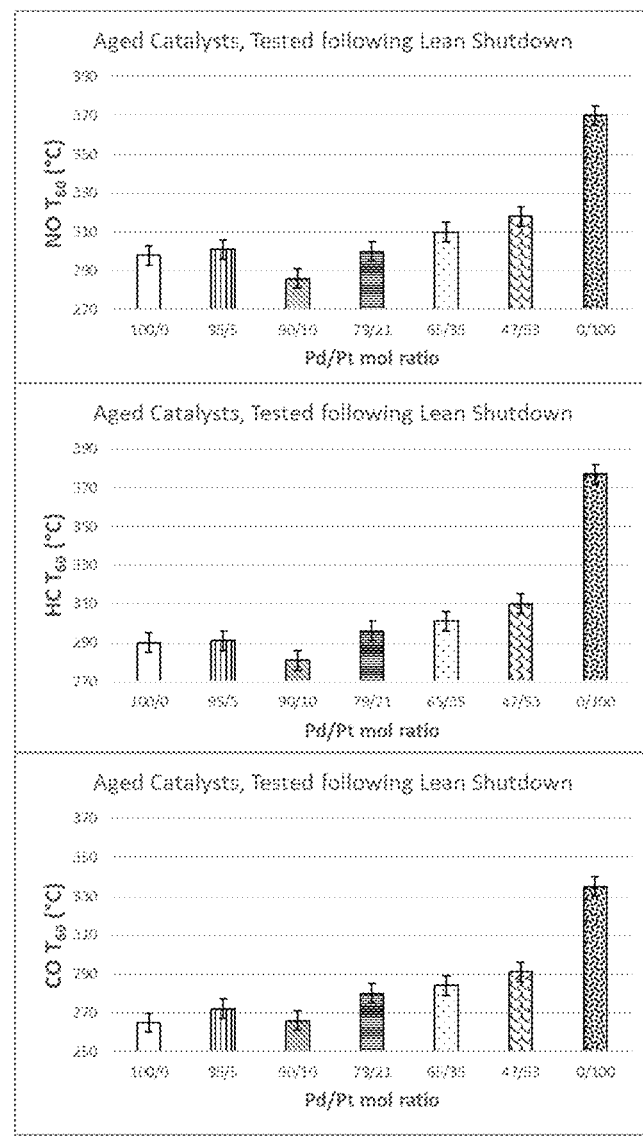
FIGS. 3a and 3b show light-off temperature results from Example 1.
Figure 3B:
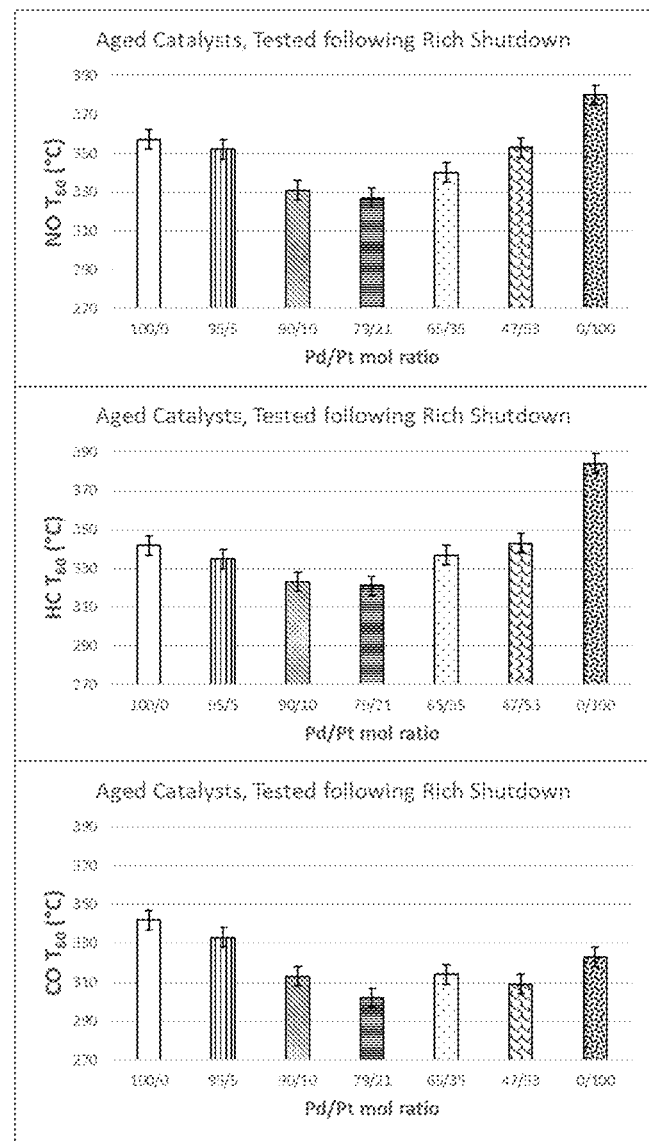

The results are shown in FIGS. 3a and 3b, which show the light-off temperatures ($T_{60}$) measured for each catalyst. FIG. 3a shows after lean shutdown and FIG. 3b shows after rich shutdown ageing conditions. Catalyst 3 (with a 90:10 Pd—Pt molar ratio) performed better following both rich and lean shut-down conditions following the ageing treatment, compared to Comparative Catalysts 1 and 7.

Figure 4:
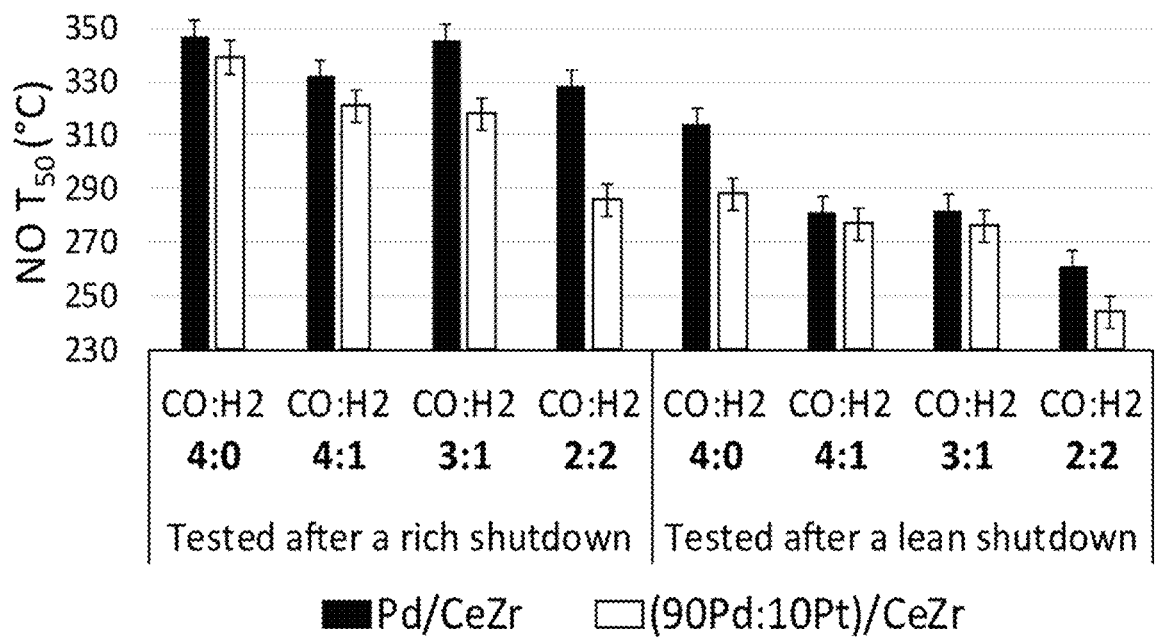
FIG. 4 show light-off temperature results for different $CO:H_2$ ratios in Example 1.

Catalyst 3 (with a 90:10 Pd—Pt molar ratio) was then tested across 6 further TWC gas mixes whereby the $H_2$:CO ratio was varied, and the results were compared to Comparative Catalyst 1 (Pd only). Catalyst 3 performed better in all cases and in particular when $H_2$ concentration was increased, indicating greater $H_2$ promotion of the activity for the Pd—Pt alloy, shown in FIG. 4. This data suggests that a Pd—Pt alloy is more robust to varying TWC gas conditions.

Example 2: Vehicle Testing Procedures and Results

General Synthesis of Catalyst Articles

Catalyst articles with Pd:Pt 100:0, 90:10, 50:50 and 27:73 mol % were prepared following standard washcoat procedure (known to the skilled person), except Pd-DMG (dimethyl glyoxime) basic solution was added to the washcoat in small portions with a solution of $HNO_3$ to reduce and maintain the pH below 7. The fully formulated catalysts contain 100 $g/ft^3$ Pd or Pd+Pt and 16 $g/ft^3$ Rh in the following architecture with a Pd top layer:

Top layer: La-doped alumina (0.7 $g/ft^3$), a rare-earth-doped ceria zirconia (0.7 $g/ft^3$), Pd(+Pt)-DMG (100 $g/ft^3$), $BaSO_4$ (200 $g/ft^3$); and Bottom layer: La-doped alumina (0.7 $g/ft^3$), a rare-earth-doped ceria zirconia (0.7 $g/ft^3$), rhodium (16 $g/ft^3$).

TABLE 4

Top Layer PGM loadings of Catalyst Articles in Example 2

|  | Molar Ratio of Pd:Pt |
|---|---|
| Comparative Catalyst Article A | 100:0 |
| Catalyst Article B | 90:10 |
| Catalyst Article C | 50:50 |
| Catalyst Article D | 27:73 |

Catalyst Articles in Table 4 were aged using gasoline engine bench aging, finished under stoichiometric gas mix. The engine bench aging was conducted using a 4.6 L engine for 50 hrs using a four mode aging cycle, with a peak bed temperature of about 1000° C. in the catalysts. The catalysts were tested on a 2.4 L vehicle via the FTP drive cycle, emissions measured directly after the catalyst (which is placed in a close-coupled system). The results of the vehicle test are summarized in FIGS. 5a-c.

Figure 5A:
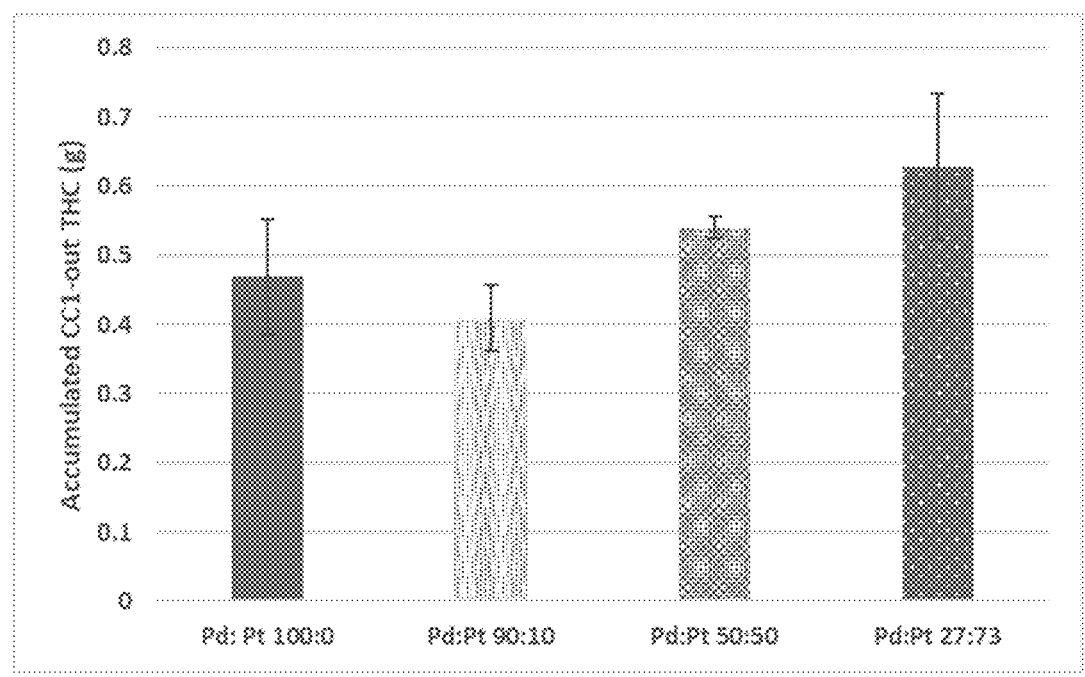
FIGS. 5a-5c show emissions results for Example 2.
Figure 5B:
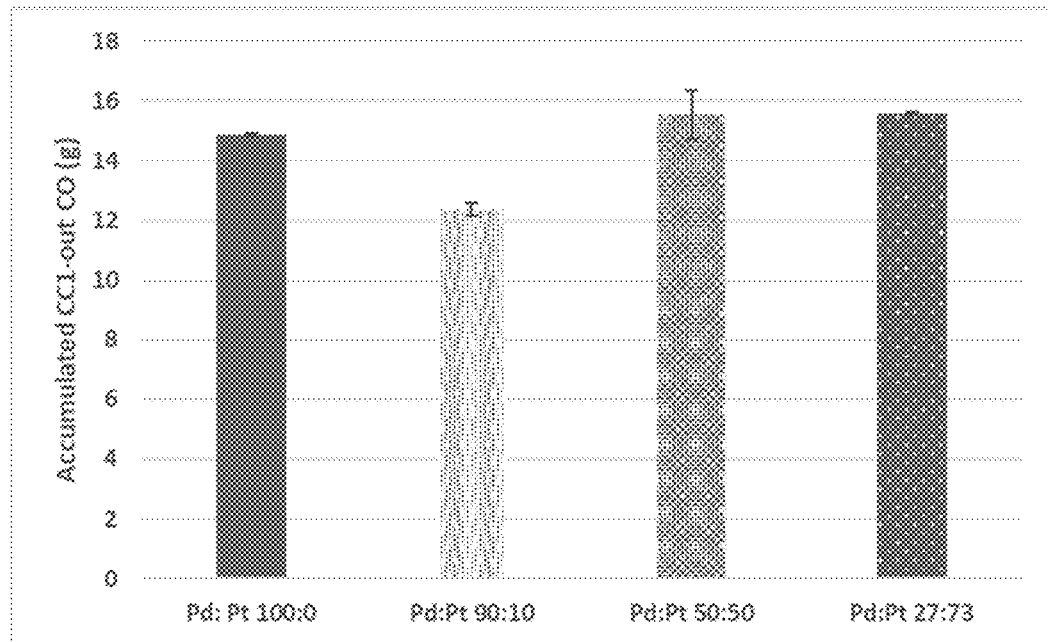
Figure 5C:
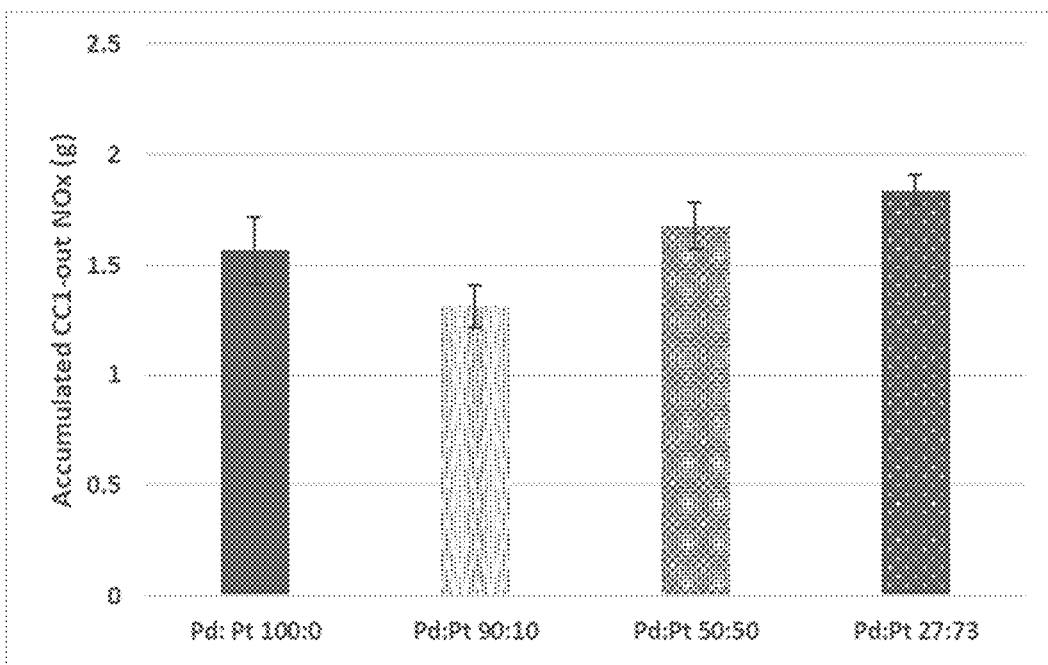

As shown in FIGS. 5a-5c, the results show a similar trend to that observed for Catalysts in Example 1. Catalyst Article B showed a ~12% improvement in total accumulated CO emission, marginally better $NO_x$ conversion (<5%) and no deterioration in HC performance, compared Comparative Catalyst Article A.

Within this series of catalyst articles, Pd can be replaced with Pt up to 50 mol % without significantly changing the total emissions and a significant benefit can be observed for Catalyst Article B (with a 90:10 Pd—Pt molar ratio).

Example 3: Vehicle Testing Procedures and Results

Comparative Catalyst Article E
First Catalytic Region:
The first catalytic region consists of Pd supported on a washcoat of CeZr mixed oxide, La-stabilized alumina, and Ba promotor, Pd nitrate solution as Pd source was used during the washcoat slurry preparation. The washcoat loading of the first catalytic region was about 1.8 g/in$^3$ with a Pd loading of 42 g/ft$^3$.

This washcoat was then coated from the inlet face of a ceramic substrate (600 cpsi, 4.3 mil wall thickness, 118.4 mm in diameter and 91 mm in length) using standard coating procedures with coating depth targeted of 80% of the substrate length, dried at 100° C.

Second Catalytic Region:

The second catalytic region consists of Rh supported on a washcoat of CeZr mixed oxide, and La-stabilized alumina. The washcoat loading of the second catalytic region was about 1.3 g/in$^3$ with a Rh loading of 8 g/ft$^3$.

This second washcoat was then coated from the outlet face of the ceramic substrate containing the first catalytic region from above, using standard coating procedures with coating depth targeted of 80% of the substrate length, dried at 100° C. and calcined at 500° C. for 45 mins.

Catalyst Article F

Catalyst Article F according to the present invention was prepared according to the similar procedure as Comparative Catalyst Article E with the exception that partial Pd replacement by Pt in the first catalytic region with Pd loading of 34 g/ft$^3$ and Pt loading of 8 g/ft$^3$ and the Pt:Pd molar ratio was about 11:89.

The second catalytic region was the same as Comparative Catalyst Article E.

The fresh Comparative Catalyst Article E and Catalyst Article F were tested over a commercial vehicle equipped with 1.6 L turbo engine under Worldwide Light Duty Testing Procedure (WLTP) with brick placed on closed couple position. vehicle exhaust diluted bag data are shown in Table 5.

In addition to the cost saving, surprisingly, Catalyst Article F of the present invention presented excellent activity on NO$_x$ emission control, compared with Comparative Catalyst Article E (e.g., see the NO$_x$ performance improved with around 37%).

TABLE 5

Results of Emissions by Vehicle Diluted Bag Data

| | Exhaust Emissions (mg/km) | | | |
|---|---|---|---|---|
| | THC | NMHC | CO/10 | NO$_x$ |
| Comparative Catalyst Article E | 23 | 20 | 28 | 62 |
| Catalyst Article F | 23 | 19 | 31 | 39 |

Example 4: Vehicle Testing Procedures and Results

Comparative Catalyst Article G
First Catalytic Region:

The first catalytic region consists of Pd supported on a washcoat of rare-earth doped CeZr mixed oxide, La-stabilized alumina, and Ba promotor, Pd nitrate solution as Pd source was used during the washcoat slurry preparation. The washcoat loading of the first catalytic region was about 2.0 g/in$^3$ with a Pd loading of 68 g/ft$^3$.

This washcoat was then coated on a ceramic substrate (600 cpsi, 3 mil wall thickness, 118.4 mm in diameter and 114.3 mm in length) using standard coating procedures followed by drying at 100° C.

Second Catalytic Region:

The second catalytic region consists of Rh supported on a washcoat of rare-earth doped CeZr mixed oxide, and La-stabilized alumina. The washcoat loading of the second catalytic region was about 2.0 g/in$^3$ with a Rh loading of 6 g/ft$^3$.

This second washcoat was then coated on the ceramic substrate containing the first catalytic region from above, using standard coating procedures, dried at 100° C. and calcined at 500° C. for 45 mins.

Catalyst Article H

Catalyst Article H according to the present invention was prepared according to the similar procedure as Comparative Catalyst Article G with the exceptions that partial Pd replacement by Pt in the first catalytic region with Pd loading of 51 g/ft$^3$ and Pt loading of 17 g/ft$^3$ (the Pt:Pd molar ratio was about 15:85), and Pd-DMG and Pt-DMG were used instead of Pd nitrate.

The second catalytic region was the same as Comparative Catalyst Article G.

Catalyst Article I

Catalyst Article I according to the present invention was prepared according to the similar procedure as Comparative Catalyst Article G with the exceptions that partial Pd replacement by Pt in the first catalytic region with Pd loading of 34 g/ft$^3$ and Pt loading of 34 g/ft$^3$ (the Pt:Pd molar ratio was about 35:65), and Pd-DMG and Pt-DMG were used instead of Pd nitrate.

The second catalytic region was the same as Comparative Catalyst Article G.

Comparative Catalyst Article G and Catalyst Articles H, I were aged using gasoline engine bench aging. The engine bench aging was conducted using a 4.0 L engine for 100 hrs using a lean spike aging cycle, with a peak bed temperature of about 1030° C. in the catalysts. The catalysts were tested on a 2.0 L engine bench via an RDE compatible drive cycle, emissions measured directly after the catalyst (which is placed in a close-coupled system). Summarized vehicle exhaust modal bag data are shown in Table 6.

In addition to the cost saving, surprisingly, Catalyst Articles H and I of the present invention presented equivalent activity on THC, CO, and NO$_x$ emission control, compared with Comparative Catalyst Article G.

TABLE 6

Results of Emissions by Vehicle Modal Data

| | Exhaust Emissions (mg/km) | | |
|---|---|---|---|
| | THC | CO/10 | NO$_x$ |
| Comparative Catalyst Article G | 107 (+/−4) | 215 (+/−18) | 126 (+/−7) |
| Catalyst Article H | 108 (+/−4) | 199 (+/−15) | 126 (+/−6) |
| Catalyst Article I | 106 (+/−4) | 200 (+/−16) | 134 (+/−9) |

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A catalyst composition comprising a first platinum group metal (PGM) component and a first support material, wherein the first PGM component comprises platinum (Pt) and palladium (Pd) and is supported on the first support material;
   wherein the first PGM component has a Pt:Pd molar ratio of from about 5:95 to about 95:5; and
   wherein the Pt and Pd are at least partially alloyed.

2. The catalyst composition of claim 1, wherein the first PGM component consists of Pt and Pd.

3. The catalyst composition of claim 1, wherein the Pt and Pd are substantially alloyed.

4. The catalyst composition of claim 3, wherein the first PGM component consists of an alloy of Pt and Pd.

5. The catalyst composition of claim 1, wherein the first support material comprises an inorganic oxide.

6. The catalyst composition of claim 5, wherein the inorganic oxide is selected from one or more of cerium oxide, a ceria-zirconia mixed oxide, an alumina-ceria-zirconia mixed oxide, alumina, magnesia, silica, lanthanum, neodymium, praseodymium, yttrium oxides, and mixed oxides or composite oxides thereof, or a zeolite.

7. The catalyst composition of claim 1 further comprising a second PGM component and a second support material.

8. The catalyst composition of claim 7, wherein the second PGM component comprises rhodium (Rh), a Rh alloy, Pt, a Pt alloy, a Rh—Pt alloy or a mixture thereof.

9. A catalyst article for treating exhaust gas comprising:
a substrate; and
a first catalytic region comprising a first platinum group metal (PGM) component and a first support material, wherein the first PGM component comprises platinum (Pt) and palladium (Pd) and is supported on the first support material;
wherein the first PGM component has a Pt:Pd molar ratio of from about 5:95 to about 95:5; and
wherein the Pt and Pd are at least partially alloyed.

10. The catalyst article of claim 9, wherein the first PGM component consists of Pt and Pd.

11. The catalyst article of claim 9, wherein the Pt and Pd are substantially alloyed.

12. The catalyst article of claim 11, wherein the first PGM component consists of an alloy of Pt and Pd.

13. The catalyst article of claim 9, wherein the first support material comprises an inorganic oxide.

14. The catalyst article of claim 13, wherein the inorganic oxide is selected from one or more of cerium oxide, a ceria-zirconia mixed oxide, an alumina-ceria-zirconia mixed oxide, alumina, magnesia, silica, lanthanum, neodymium, praseodymium, yttrium oxides, and mixed oxides or composite oxides thereof, or a zeolite.

15. The catalyst article of claim 9 further comprising a second catalytic region.

16. The catalyst article of claim 9, wherein the first catalytic region comprises from 20 $g/ft^3$ to 400 $g/ft^3$ total Pt and Pd.

17. The catalyst article of claim 15, wherein the second catalytic region comprises from 2 $g/ft^3$ to 200 $g/ft^3$ Rh.

18. An emission treatment system comprising the catalyst composition of claim 1.

19. A method of treating an exhaust gas, the method comprising:
providing the catalyst composition of claim 1; and
contacting the catalyst composition or catalyst article with an exhaust gas.

20. A method of manufacturing a catalyst article, the method comprising:
providing a slurry comprising:
platinum (Pt) and palladium (Pd) ions in a molar ratio of from about 5:95 to about 95:5, and
a support material;
disposing the slurry on a substrate; and
heating the slurry to form nanoparticles of the Pt and Pd on the support material, wherein the Pt and Pd are at least partially alloyed.

21. The method of claim 20, wherein the slurry comprises one or more of glyoxime; a glyoxime derivative; salicylaldimine, and a salicylaldimine derivative.

* * * * *